Figure 1:
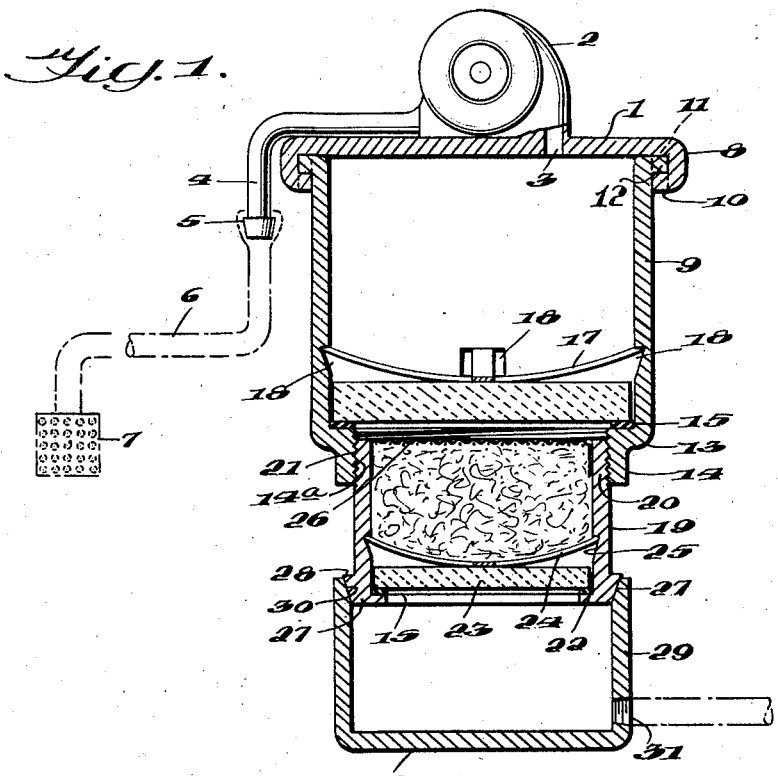

Feb. 10, 1948.   J. R. GRANDIN ET AL   2,435,627
PORTABLE FILTER
Filed Feb. 26, 1944

Inventors
JAMES R. GRANDIN,
ERNEST F. MECHLIN,
By Ernest F. Mechlin
THEIR Attorney Patented Feb. 10, 1948

2,435,627

UNITED STATES PATENT OFFICE 2,435,627

PORTABLE FILTER

James R. Grandin and Ernest F. Mechlin, Washington, D. C.

Application February 26, 1944, Serial No. 524,060

1 Claim. (Cl. 210—104)

The invention relates to filters and more particularly to a small compact and readily transportable filter suitable for troops, explorers and the like.

The principal object of the invention generally stated is to provide a portable filter in which all of the filtering elements are impregnated with a colloidal coating of a germicide, whereby the apparatus not only will clarify the water or other portable fluid, but will at the same time purify the same by materially reducing, if not entirely eliminating, the bacteria content thereof to render such water or other portable fluid suitable for human consumption.

Still another object of the inventiton is to provide a collapsible filter in which a plurality of filter chambers and a clear water chamber may be nested into a compact unit which may easily and quickly be assembled or disassembled without injury to the filter mechanism or destruction of the beneficial effects of the filter.

Still another object of the invention is to provide in a filter of the type described, a complete and compact unit including a suitable pump adapted to draw water from any source and to convey the same into the first of a series of filter chambers, the lowermost chamber being not only adapted to receive the filtered fluid but to have means connected therewith whereby the filtered fluid may be dispensed readily and easily.

To these and other ends the invention comprises the various elements and combinations of elements hereinafter set forth, the novel features thereof being pointed out in the appended claim.

Figure 2:
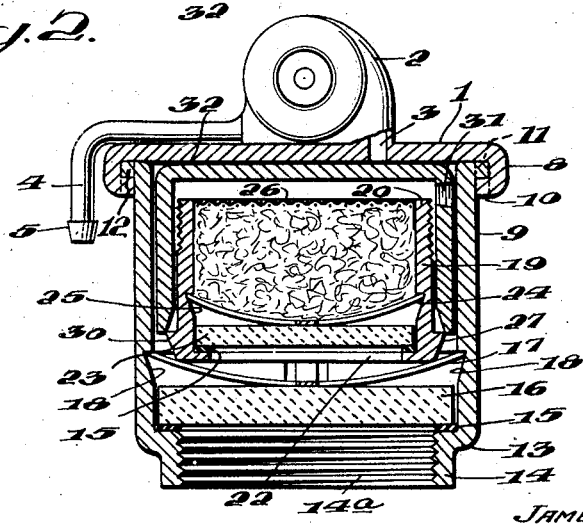

In the drawing, which has been selected to illustrate a single embodiment of the invention:

Figure 1 is a sectional view of the filter assembled in operative relationship; and Figure 2 is a similar sectional view illustrating the filter packed for transportation.

Throughout the drawing and the specification, like parts of the invention have been designated by like characters.

The filter comprises a top or cover 1 having connected thereto a pump 2 which may, as illustrated, comprise a centrifugal pump having a discharge orifice 3 leading through the cover 1 and having an intake connection 4 which preferably terminates in a fitting 5 adapted to receive a hose or other tube 6, the latter having at its opposite end a strainer 7 adapted to be immersed in the source of fluid. The cover 1 is provided with a flange 8 adapted to be connected or disconnected from the upper chamber 9 by means of lugs 10 which are adapted to enter slots 11 in the flange 12 of the container 9 and to be partially rotated so as to interlock the cover and container 9. This container is provided at its opposite end with a shoulder portion 13 terminating in a downwardly extending flange portion 14, the latter being interiorly threaded as at 14a, and as will be hereinafter fully set forth. The shoulder portion 13 is adapted to have mounted therein a gasket member 15 against which seats preferably a disc 16 formed of porcelain or the like, and used for filtering purposes. The disc 16 is maintaineed in water-tight relation with the gasket 15 by means of the spring spider 17, the ends of the spider being adapted to engage countersunk shoulders 18 in the wall of the container or chamber 9. The numeral 19 designates an intermediate chamber having at its upper end 20 an exteriorly threaded portion 21 adapted to threadedly engage the threads 14a of the upper chamber 9. At its lower end the chamber 19 is provided with a shoulder portion 22 having a similar gasket 15 on which is adapted to seat a second porcelain or other suitable filter disc 23. The latter is likewise maintained in water-tight relation by means of a spider 24, the ends of which engage countersunk recesses 25 in the interior walls of the chamber 19. Secured to the top of the chamber 19 is a wire mesh 26 and interposed between the wire mesh and the upper face of the disc 23 we preferably place a plurality of granules of filter material, such as florite, which is an activated natural bauxite. The size of the granules is such as will pass through a 30/48 standard mesh screen. Other suitable filtering material such as "Floridin," the trade name for fuller's earth produced in Florida or Georgia, or "Florisil," the trade name for synthetic magnesium silicate, may be used.

Adjacent the shoulder portion 22 of the chamber 19 we provide the same with an exterior downwardly tapered portion 27 forming an upwardly facing shoulder 28 and when the filter is assembled the chamber 29 having in its upper inner circumference a corresponding beveled portion 30, is adapted to have a sliding fit with the inclined surface 27 of the chamber 19 and these surfaces are preferably ground so as to make a water-tight joint. The chamber 29 is closed at its bottom and is provided with an opening 31 which is preferably threaded to receive the fitting on a pipe or tube through which the filtered fluid may be dispensed.

It will be obvious from an inspection of the drawing that the chamber 19 with its filter contents can be readily disconnected from the chamber 9 by unscrewing the same and after it is unscrewed the overall height of the chamber 19 is such that it can be inserted in the chamber 9 with the screen portion extending adjacent the upper edge of the chamber 9. The chamber 29 may be then inverted and placed between the wall of the chamber 19 and the adjacent wall of the chamber 9 until the upper edge of the chamber 29 engages the shoulder 28 on the exterior face of the chamber 19, the dimension of the chamber 29 being such that when engaged with the shoulder 28 the lower surface 32 of the chamber 29 will engage the inner face of the top or cover 1 of the chamber 9 when the same is assembled with the chamber 9. This makes a compact unit which is easily transported and the parts are clamped in position between the filter disc 16 and the cover 1 of the chamber 9 and may be easily assembled without the use of tools or other equipment.

Preferably, as stated in one of the objects of the invention, the porcelain discs 16 and 23 as well as the granular filter material, are impregnated with a colloidal coating of metals in any other well known manner in order to provide the same with certain well known germicidal properties. It is well known that filter discs as well as granular filter material, unless constantly cleansed by baking or other suitable means, tend to become impregnated with bacteria to the detriment of the fluid filtered therethrough. It is also well known that where the pores of the filters either of disc or granular form are provided with colloidal coating of metal such as gold, silver or copper or alloys of the same, that the metals have a germicidal property which not only prevents the growth of bacteria but acts effectively to kill bacteria passing through the pores of the filter.

Repeated tests have shown that water high in bacteriar count when passed through filters having elemental silver, gold or copper deposited as a colloidal film in the pores thereof, is substantially free of bacteria and, further, it was found that in water after being filtered which is allowed to stand for a period of time that the bacteria which may have survived the passage through the filter has, by reason of contact with the elemental metal, maintained sufficient germicidal property to destroy the remaining bacteria leaving the water purified and palatable.

We make no claim to the colloidal treatment of the filter material except in combination with the particular design of filter herein shown and described.

We claim:

In a collapsible filter assembly, the combination of a chamber open at both ends, a cover having an inlet port and interlockingly secured to one end of said chamber, a resilient gasket adjacent another end of said chamber, a porous disk seated upon said gasket and closing the associated end of said chamber, means interlocked with said chamber and urging said disk into tight engagement with said gasket, a second chamber open at both ends, one end of said second chamber being interlocked with an end of said first chamber, granular filter material within said second chamber, a yieldable gasket adjacent an end of said second chamber removed from said first chamber, a second porous disk seated upon said yieldable gasket, means interlocked with said second chamber and urging said second porous disk into tight engagement with said yieldable gasket, a third chamber having an outlet port and closed at one end only, and another end of said third chamber interlocked and communicating with said second chamber.

JAMES R. GRANDIN.
ERNEST F. MECHLIN.

REFERENCES CITED

The following references are of record in the file of this patent:

UNITED STATES PATENTS

| Number | Name | Date |
|---|---|---|
| 1,000,332 | Dyer | Aug. 8, 1911 |
| 2,008,131 | Dieck | July 16, 1935 |
| 2,283,883 | Conconi | May 19, 1942 |
| 2,299,182 | Schoof | Oct. 20, 1942 |
| 2,300,259 | Keuppers | Oct. 27, 1942 |
| 855,820 | Stebbins | June 4, 1907 |
| 1,997,830 | Michaud | Apr. 16, 1935 |
| 1,988,246 | Krause | Jan. 15, 1935 |
| 1,547,855 | Burson | July 28, 1925 |
| 2,202,055 | Juffa | May 28, 1940 |
| 1,685,204 | Schreier | Sept. 25, 1928 |

FOREIGN PATENTS

| Number | Country | Date |
|---|---|---|
| 11,035 | Great Britain | Sept. 20, 1887 |
| 17,363 | Germany | Mar. 10, 1882 |
| 333,000 | France | Nov. 12, 1903 |
| 9,599 | Great Britain | May 24, 1900 |
| 25,730 | Great Britain | 1913 |
| 18,287 | Great Britain | 1896 |